United States Patent Office 3,474,163
Patented Oct. 21, 1969

3,474,163
PROCESS OF SPINNING FILAMENTS OF
VINYLIDENE CYANIDE
Saunders Eliot Jamison, Summit, N.J., assignor to
Celanese Corporation, New York, N.Y., a corporation of Delaware
No Drawing. Continuation of application Ser. No. 280,153,
May 13, 1963. This application Nov. 22, 1967, Ser. No. 685,217
Int. Cl. D01d 5/12; D01f 7/06
U.S. Cl. 264—210                    7 Claims

ABSTRACT OF THE DISCLOSURE

A method of spinning a vinylidene polymer containing at least about 45 percent vinylidene cyanide and at least one additional ethylenically unsaturated monomer polymerizable therewith, by dissolving the polymer in a solvent mixture comprising dimethylsulfoxide and a more volatile solvent such as acetone or acetonitrile, wherein the more volatile solvent is present in the greater proportion. The filament is spun by extruding the prepared solution through a shaped orifice, removing the more volatile solvent to rigidify the filaments, stretching the filaments while still plasticized with residual solvent and subsequently removing the residual solvent. One method for partially removing the solvent is by spinning the solution into an evaporative atmosphere, stretching and subsequently washing the residual solvent from the filaments. Another method involves spinning into an acetic acid coagulation bath, air stretching and subsequently removing the residual solvent.

---

This application is a streamlined continuation of application Ser. No. 280,153 filed on May 13, 1963.

The present invention relates to a novel method for preparing improved fibers, and also relates to novel polymer solutions, which solutions can be extruded to form improved fibers or cast upon a surface to form a film.

More particularly, this invention relates to novel solutions which can be extruded or cast, such solutions comprising a vinylidene cyanide copolymer dissolved in a solvent mixture of a minor proportion of a strong solvent for such copolymer, e.g., dimethyl sulfoxide, and a major proportion of a relatively weaker solvent such as a nitrile, e.g., acetonitrile, a ketone, e.g., acetone, or mixtures thereof.

The invention also relates to the novel methods for forming improved fibers and films. One such method, which is of the dry spinning type, comprises extruding through a shaped orifice and into a fluid, e.g., air, a solution of a vinylidene cyanide copolymer dissolved in the foregoing solvent mixture.

Alternatively, the foregoing polymer solution can be cast upon a surface and the solvents evaporated therefrom to form a self-supporting film.

Another fiber-forming method of this invention is of the wet spinning type and involves extruding through a shaped orifice a solution of a vinylidene cyanide copolymer dissolved in a strong solvent such as dimethyl sulfoxide. In this instance the extrusion is into an acid-containing liquid coagulant.

It is well known that synthetic resinous copolymers of vinylidene cyanide and another monomer copolymerizable therewith presents valuable fiber-forming and film-forming characteristics.

The resinous copolymers of vinylidene cyanide which are contemplated herein generally contain in excess of about 45% of vinylidene cyanide (methylene malononitrile or vinylidene dinitrile) units copolymerized with one or more ethylenically unsaturated monomers such as vinyl acetate or the like, as described in U.S. Patents 2,615,865 through 2,615,880 inclusive, 2,628,954, 2,-650,911, 2,654,724, 2,654,728, 2,765,197, 2,716,104, 2,-716,105, 2,716,106, and 2,740,769 and Canadian Patent No. 569,262.

The copolymers usually comprise units of vinylidene cyanide alternated with one or more copolymerizable monomers selected from the following classes of compounds:

(1) Vinyl esters of aliphatic monocarboxylic acids, preferably of the structure RCOOH, wherein R is an alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in U.S. Patent 2,615,866, issued Oct. 28, 1952.

(2) Vinyl esters of the structure

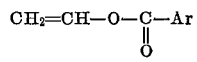

wherein Ar is an aromatic radical in which all the hydrogen atoms are attached to carbon atoms, such as vinyl benzoate; homologs of vinyl benzoate of the formula

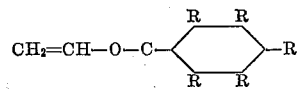

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, vinyl m-chlorobenzoate, and similar vinyl halobenzoates and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide, of such monomers, and the resulting copolymers are disclosed in U.S. Patent 2,-615,867, issued Oct. 28, 1952.

(3) Styrene and substituted styrenes of the general formula

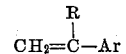

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha bromostyrene, 2,5-dichlorostyrene, 2,5-dibromostyrene, ortho-, meta-, and paramethoxy styrene, para-alpha-dimethyl styrene, paramethyl styrene, 3,4-dichlorostyrene, 3,4-difluorostyrene, 2,4-dichlorostyrene, 2,4,5-trichlorostyrene, dichloromonofluorostyrenes and the like. Copolymerization of vinylidene cyanide with styrene and substituted styrenes is disclosed in U.S. Patent 2,615,868, issued Oct. 28, 1952:

(4) Olefins of the general structure

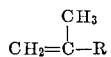

wherein R is an alkyl radical, preferably containing from 1 to 6 carbon atoms, such as isobutylene (2-methyl propene-1), 2-methyl-butene-1, 2-methylpentene-1, 2,3-dimethylbutene-1, 2,3-dimethyl-pentene-1, 2,3,3-trimethylbutene-1, 2,3,4-trimethylpentene-1, 2,6-dimethyloctene-1, 2-methylnonadecene-1, and the like. Copolymerization of such olefins with vinylidene cyanide is disclosed in U.S. Patent 2,615,865, issued Oct. 28, 1952:

(5) Alkyl esters of methacrylic acid which possess the structure

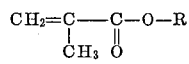

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in U.S. Patent 2,615,871, issued Oct. 28, 1952:

(6) 2-halogenated monoolefins of the structure

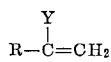

wherein R is a lower alkyl radical such as methyl, ethyl, propyl or butyl, and Y is a halogen atom, such as 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodiopropene, 2-iodopentene, and the like. Copolymerization of these compounds with vinylidene cyanide is disclosed in U.S. Patent 2,615,877, issued Oct. 28, 1952:

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromo propionate, and the like, the copolymerization of all of which with vinylidene cyanide is described in U.S. Patent 2,615,875, issued Oct. 28, 1952:

(8) Vinyl esters of alpha-halo saturated aliphatic monocarboxylic acids of the structure

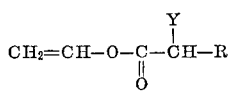

wherein R is a member of the class consisting of hydrogen and an alkyl radical, preferably a lower alkyl radical, and Y is a halogen atom, such as vinyl alpha-chloroacetate, vinyl alphabromoacetate, vinyl alpha- iodopropionate, vinyl alpha-bromovalerate and the like. The copolymerization of such monomers with vinylidene cyanide is described in U.S. Patent 2,615,876 issued Oct. 28, 1952:

(9) Vinyl halides such as vinyl chloride, vinyl bromide and the like, which are copolymerized with vinylidene cyanide as described in U.S. Patent 2,615,869, issued Oct. 28, 1952.

In addition to interpolymers of vinylidene cyanide containing the essentially 1 to 1 molar alternating structure and essentially 50 mol percent vinylidene cyanide units, such as those disclosed in the patents referred to above, other vinylidene cyanide interpolymers have been described. For example, there are included interpolymers, of this vinylidene cyanide content, made from vinylidene cyanide and more than one copolymerizable monoolefinic compound, at least one of which forms an essentially 1:1 alternating copolymer when copolymerized with vinylidene cyanide, a large number of which interpolymers are disclosed in U.S. Patent 2,716,106.

Other polymerizable monoolefinic compounds form interpolymers with vinylidene cyanide, in addition to those set out above, including, by way of example, the following classes of compounds:

Monoolefinic hydrocarbons, such as 2,3-dimethylhexene-1; 2,3,4-trimethyl-pentene-1, ethylene, propylene, butylene, amylene, hexylene and the like.

Esters of unsaturated acids other than methacrylic, e.g., of acrylic acid and tiglic acid such as methyl acrylate, ethyl acrylate, propyl acrylate, isopropyl acrylate, amyl acrylate, 3,5,5-trimethylhexylacrylate, dodecylacrylate and ethyl tiglate.

Allyl and substituted allyl esters, such as allyl chloride, allyl cyanide, allyl bromide, ally fluoride, allyl iodide, allyl nitrate, allyl thiocyanate, allyl butyrate, allyl benzoate, allyl 3,5,5-trimethyl hexoate, allyl lactate, allyl pyruvate, allyl acetoacetate, allyl thioacetate, as well as methallyl esters corresponding to the above allyl esters as well as esters from such alkenyl alcohols as beta-ethyl allyl alcohol, beta-propyl allyl alcohol, and 1-buten-4-ol.

Esters of substituted acrylic acids, such as methyl alpha-chloroacrylate, methyl alpha-bromoacrylate, ethyl alpha-chloroacrylate, propyl alpha-chloroacrylate, amyl alpha-chloroacrylate, 3,5,5-trimethyl hexyl alpha-chloroacrylate and decylalpha-cyano acrylate;

Esters of monoethylenically unsaturated dicarboxylic acids, such as dimethyl maleate, diethyl maleate, dimethyl fumurate and diethyl fumurate.

Monoolefinically unsaturated organic nitriles such as acrylonitrile, methacrylonitrile, 1,1 - dicyano propene-1, crotonitrile, oleonitrile and the like.

Monoolefinically unsaturated carboxylic acids such as acrylic acid, methacrylic acid, crotonic acid, butenoic acid, angelic acid, tiglic acid and the like.

Of these vinylidene cyanide copolymers a particularly useful copolymer which can readily be converted to filaments of excellent physical properties is the copolymer of vinylidene cyanide and vinyl acetate preferably consisting essentially of a regular structure of alternated units of the monomers, i.e., approximately 50 mol percent of each.

To improve the dyeability of the resultant fibers, the monomers making up the vinylidene cyanide copolymer may be copolymerized along with sufficient amount of an ethylenically unsaturated organic sulfonic acid to produce a copolymer containing about 0.15 to 2 mol percent of the sulfonic acid component.

Representative sulfonic acids which may be employed include styrene sulfonic acids, such as ortho-, meta- or para styrene sulfonic acid as well as commercial mixtures thereof, ortho-, meta- or para-sulfomethyl styrene, mixtures thereof, substitution products thereof such as polysulfo derivatives as well as β-sulfoethyl methacrylate (isethionic acid ester of methacrylic acid), sulfonic acids wherein the sulfo group is less than three atoms removed from the ethylenic unsaturation, e.g., vinylsulfonic acid, allylsulfonic acid, methallyl sulfonic acid and the like.

It is frequently desirable to employ a mixture of more than one of the foregoing vinylidene cyanide polymers in order to form fibers, e.g., a mixture of a copolymer of vinylidene cyanide and vinylacetate and a terpolymer of vinylidene cyanide, vinyl acetate and an ethylenically unsaturated sulfonic acid or a salt thereof such as a styrene sulfonic acid or potassium styrene sulfonate. The fibers may also contain various additives in addition to the vinylidene cyanide polymer or polymers, e.g., a polymer of N,N- dimethyl acrylamide, a copolymer of N,N-dimethyl acrylamide and vinyl acetate, etc.

Accordingly, it is an object of this invention to provide novel methods for preparing improved fibers and films.

Another object is to provide a method of forming fibers, which fibers can be formed at unusually high speeds.

A further object is to provide novel polymer solutions which can be used in the formation of fibers and films.

A further object is to provide a novel method of forming fibers, which method enables a spinning solution to be extruded through a shaped orifice to form fibers at unusually low temperatures.

Additional objects will become apparent hereinafter.

I have discovered novel polymer solutions, which solutions are stable and which can be extruded to produce colorless, clear, lustrous fibers. In accordance with one aspect of my invention, such solutions are formed by dissolving a vinylidene cyanide copolymer in a solvent mixture of a minor proportion of a strong solvent, e.g., dimethyl sulfoxide, and a major proportion of a weaker solvent, e.g., a nitrile such as acetonitrile, a ketone such as acetone, or mixtures thereof.

The relative proportions of strong solvent and weaker solvent making up the solvent mixture may vary. However, it is desirable that the amount of strong solvent, e.g., dimethyl sulfoxide, be from about 15 to 40% by weight, and the amount of weaker solvent, e.g., acetonitrile acetone, or the like be from about 50 to 85%. Water may also be present in the solvent mixture, generally in an amount of from about zero to 10% by weight. A more preferred range is from about 25 to 35% of strong solvent, from about 65 to 75% of weaker solvent, and from about zero to 5% water.

The amount of vinylidene cyanide copolymer dissolved in the solvent mixture will vary depending upon the particular end application contemplated, e.g., fiber formation, film formation, etc., and upon the specific nature of the vinylidene cyanide copolymer to be dissolved. In general, the solution will contain from about 15 to 35% by weight of vinylidene cyanide copolymer, a more preferred range being from about 20 to 30%.

Another aspect of my invention relates to the extrusion of the foregoing polymer solutions into a fluid, e.g., air, whereby lustrous, clear fibers are formed, the air serving as the coagulating and drying medium for the extruded fiber. When carrying out this type of process, a relatively weaker solvent which is more volatile than the strong solvent is used; preferably, the relatively weaker solvent has an atmospheric boiling point no higher than about 100° C.

Considering the components of my solvent mixture, the strong solvent, which desirably is dimethyl sulfoxide, exerts a strong solvent action upon the vinylidene cyanide copolymer, but has a relatively high boiling point. The relatively weaker solvent, e.g., a ketone such as acetone and/or a nitrile such as acetonitrile, exerts a relatively weak solvent action on the vinylidene cyanide copolymer but has a relatively low boiling point and is, hence, much more volatile than the dimethyl sulfoxide. Accordingly, as the solution of vinylidene cyanide copolymer is extruded into air through a shaped orifice such as a spinnerette, jet, or the like, there results a rather rapid evaporation of the more volatile relatively weak solvent. Thus, the coagulated filament initially consists primarly of the vinylidene cyanide copolymer and the less volatile dimethyl sulfoxide. The strong solvent, e.g., dimethyl sulfoxide, contributes plasticity to the fiber, enabling the fiber to be stretched and thereby strengthened through orientation of the polymer molecules. Such plasticity does not, however, prevent the ready handling and passage of the fibers over the guides required for the stretching operation. The strong solvent is, of course, ultimately removed, e.g., by evaporation (desirably under reduced pressure), or by heating, washing, or the like.

The foregoing polymer solutions exhibit appreciable low-temperature fluidity. Thus, such solutions can be extruded successfully at temperatures as low as about 20° C.

Due to the presence of the strong solvent such as dimethyl sulfoxide during the stretching of the fiber, significant increases in fiber strength are attainable. Thus, the extruded fiber is subjected to stretching, e.g., in ambient air at room temperature, thereby orienting the polymer molecules and substantially increasing the strength of the fiber.

The foregoing polymer solutions are particularly advantageous in that they can be extruded into an evaporative atmosphere and initially taken up at relatively high speeds, e.g., of at least 50 meters per minute. In particular, it has been found that by using a pressure, e.g., nitrogen pressure of about 400 p.s.i.g. on the spinning solution, the initial takeup speed can be readily adjusted to be in excess of 300 meters per minute. By employing conventional commercial spinning pressures and equipment, wherein the spinning pressures are considerably higher than 400 p.s.i.g., much greater initial takeup speeds are attainable, e.g., of the order of about 400 to 600 meters per minute. The material can then be stretched by transferring it to stretching rolls, rotating at a rate greater than that of the initial takeup rolls, and within the range, for example, of 100 to 1000 meters per minute.

It is frequently desirable to incorporate into the spinning solution, along with the vinylidene cyanide copolymer, another polymeric composition which serves to further plasticize and enhance the dyeability of the ultimately extruded fiber. For example, it is often advisable to dissolve in the solvent mixture from about 90 to 95% of a vinylidene cyanide copolymer and correspondingly from about 10 to 5% of a copolymer of N,N-di-methyl acryamide and vinyl acetate, typically containing from about 70 to 80% dimethyl acrylamide and correspondingly of about 30 to 20% of vinyl acetate units.

In accordance with yet another aspect of my invention, I have found that certain solutions of vinylidene cyanide copolymer in dimethyl sulfoxide can be wet-spun to produce improved fibers. I have found that a highly desirable spinning solution can be obtained by dissolving vinylidene cyanide copolymer in dimethyl sulfoxide. There results a clear yellow tinted solution, which solution exhibits fluidity at unusually low temperatures, e.g., at least as low as 15° C. I have further found that when such a solution is extruded into an appropriate acid-containing liquid coagulant, there results solid, clear, strong fibers.

The foregoing low-temperature fluidity of the polymer solution is highly advantageous in that it permits much greater ease of handling of spinning solutions. Thus, there is no need to supply external heat to channels, pipes, tubes, or other conduits which are used to transport such spinning solutions.

The acid-containing liquid coagulant should not exert a solvent action upon the vinylidene-cyanide copolymer. Desirably, the acid employed should be an organic acid, and preferably a water-soluble alkanoic acid. Particular preference is accorded acetic acid. If desired, the coagulant for the vinylidene cyanide copolymer may contain, along with an acid of the foregoing type, another component such as water, methanol, ethylene glycol, ethyl acetate, propanol, etc.

As previously noted, I have found that acetic acid is particularly suitable as the liquid coagulant. Thus, when acetic acid is utilized, I have found that the most rapid fiber take-up speeds can be obtained. Moreover, the resultant fibers exhibit unusual strength.

In addition to dimethyl sulfoxide, other strong solvents for vinylidine cyanide polymers are dialkyl carbonamides such as dimethyl formamide and dimethyl acetamide, lactones of hydroxyalkanoic acids such as gamma-butyrolactone, sulfones, e.g., thioalkane 1-dioxides such as sulfolane, and cyclic alkylene carbonates such as propylene carbonate and ethylene carbonate.

The following examples will further illustrate my invention. All parts are by weight unless otherwise stated.

EXAMPLE 1

The following components were mixed in the proportions indicated to form a clear, yellow spinning solution:

| Component: | Amount |
|---|---|
| Terpolymer obtained by copolymerizing about 49.4 parts of vinylidene cyanide, about 50 parts of vinyl acetate, and about 0.6 part of styrene sulfonic acid. (Inherent viscosity of 1.8 measured at 25° C. from a 0.4% solution in gamma-butyrolactone) | 92 |
| Solution containing 8 parts of copolymer obtained from copolymerizing 75 parts of N,N-dimethyl acrylamide and 25 parts of vinyl acetate (inherent viscosity of 1.9 measured at 25° C. from a 0.4% solution in gamma-butyrolactone) dissolved in 88/12 acetonitrile-water | 38 |
| Acetonitrile | 137 |
| Dimethyl sulfoxide | 82 |

The foregoing solution was clear and remained stable indefinitely at about 20° C. This solution was extruded under 400 p.s.i.g. nitrogen pressure through a spinnerette (maintained at 98° C.) containing five holes, each having a diameter of 0.042 mm. The extrusion was a dry spinning operation wherein the extruded fibers were passed through room temperature air for a distance of five feet. Thereafter, the fibers were taken up steadily at a rate of 306 meters per minute. A portion spun for 20 seconds was cut off and immediately washed by immersion in water. The resultant clear fibers had a tenacity of 0.7 gram per denier, an elongation of 40% and a denier of 1.9.

EXAMPLE 2

The procedure of Example 1 was repeated; however, the spinning solution was of the following composition:

| Component: | Parts |
|---|---|
| Terpolymer of Example 1 | 92 |
| Copolymer solution of Example 1 | 38 |
| Dimethyl sulfoxide | 100 |
| Acetone | 185 |

The foregoing solution was clear and remained stable indefinitely at a temperature of 20° C. This solution was spun using the procedure described in Example 1 and was taken up at a speed of 250 meters per minute. The resultant fibers were lustrous and clear.

EXAMPLE 3

The spinning solution described in Example 2 was extruded as described in Example 2 and was taken up on a takeup roll at a speed of 49.5 meters per minute. The resultant five filament yarn was continuously stretched through room temperature air by means of a second roll which turned at peripheral velocity in excess of 50 meters per minute. The second roll was continuously washed by a stream of water at a temperature of 60° C. The following table tabulates the mechanical properties of the resultant fibers in relation to the speed of the stretch roll.

TABLE

| Stretch roll speed, meters per minute | Filament, denier | Elongation, percent | Tenacity, grams per denier |
|---|---|---|---|
| 51 | 5.9 | 49 | 0.58 |
| 65 | 6.1 | 46 | 0.72 |
| 75 | 4.8 | 34 | 1.22 |
| 93 | 3.6 | 15 | 1.82 |

EXAMPLE 4

A spinning solution of the same composition as that described in Example 1 was extruded through a spinnerette (maintained at about 90° C.) with 40 holes, each having a diameter of 0.048 mm. The resultant filaments were passed through a 23 foot length cabinet maintained at a temperature of about 110° C. to a take-up roll and stretch and wash roll using the same procedure as described in Example 3. The following table tabulates takeup and stretch roll speeds and coresponding mechanical properties for the resultant fiber.

| Takeup roll speed, meters per minute | Stretch roll speed, meters per minute | Filament, denier | Elongation, percent | Tenacity, grams per denier |
|---|---|---|---|---|
| 100 | 150 | 5.6 | 56 | 1.0 |
| 150 | 200 | 5.8 | 60 | 0.83 |
| 225 | 240 | 4.4 | 36 | 0.72 |

A 20% solution of a copolymer of 50% vinylidene cyanide and 50% vinyl acetate in dimethyl sulfoxide was extruded under 100 p.s.i.g. nitrogen pressure through a spinnerette (maintained at 70° C.) containing five holes, each of 0.076 mm. diameter. This was a wet extrusion with the fibers being extruded directly into a coagulation bath of 100% acetic acid maintained at 70° C. After immersion in the bath for a distance of three feet, the fibers were wound over skewed rolls at a rate of 20 meters per minute and were then stretched through air at room temperature by means of a perforated takeup bobbin operated at 80 meters per minute. The resultant fibers were then washed on the takeup bobbin with cold tap water and were dried on the bobbin in room temperature air. Perfectly transparent fibers were obtained, which fibers had a tenacity of 1.9 grams per denier and an elongation of 14%.

EXAMPLE 6

The copolymer solution described in Example 5 was again extruded into acetic acid. The coagulation temperature was increased stagewise and at several temperature levels the speed of the rolls was increased until the fiber broke. The following table tabulates maximum coagulation speed at the various temperatures and describes the appearance of the resultant fibers.

| Acetic acid bath temperature, ° C. | Maximum coagulation speed, meters per minute | Fiber Appearance |
|---|---|---|
| 23 | 7 | Clear lustrous filaments. |
| 30 | 9 | Do. |
| 40 | 10 | Do. |
| 65 | >45 | Fibers opaque at lower speeds, transparent at highest speeds. |
| 72 | 55 | |

Variations can, of course, be made without departing from the spirit of my invention.

Having thus described my invention, what I desire to secure and hereby claim by Letters Patent is:

What is claimed is:

1. A method of preparing fibers comprising mixing with a solvent about 15 to 35 weight percent of a polymer having in excess of about 45 percent of a vinylidene cyanide and at least one additional ethylenically unsaturated monomer polymerized therewith, said solvent consisting essentially of a mixture of from about 25 to 35 percent by weight of dimethylsulfoxide and about 65 to 75 percent by weight of a weak solvent for said polymer selected from the group consisting of acetone, acetonitrile and mixtures thereof, thereby forming a spinning solution, extruding said solution through a shaped orifice to form a filament, removing substantially all of the weak solvent from said filament to rigidify said filament, stretching said filament in ambient air at room temperature while retaining said dimethylsulfoxide which has a plasticizing effect on said filament and subsequently removing the residual solvent.

2. The method of claim 1 wherein the weak solvent is acetonitrile.

3. The method of claim 1 wherein the solution is spun under dry spinning conditions into an evaporative atmosphere to remove substantially all of the weak solvent.

4. The method of claim 1 wherein the filaments are spun under wet spinning conditions by spinning into a 100 percent acetic acid coagulation bath, removing substantially all of the weak solvent, removing the filaments from the bath, stretching the filaments in ambient air at room temperature and subsequently water washing said filaments.

5. A method for perparing fibers comprising mixing with a solvent about 25 to 35 weight percent of a polymer comprising in excess of about 45 percent of vinylidene cyanide polymerized with at least one additional ethylenically unsaturated monomer, said solvent consisting essentially of a mixture of from about 25 to 35 percent by weight of dimethylsulfoxide and about 65 to 75 percent of a weak solvent for said polymer selected from the group consisting of acetone, acetonitrile and mixtures thereof, thereby forming a spinning solution, and extruding said solution through a shaped orifice into a coagulating bath comprising substantially 100 percent acetic acid.

6. The method of claim 5 wherein the filaments are stretched in ambient air at room temperature as they are removed from the coagulation bath.

7. The method of claim 6 wherein the filaments are removed from the coagulation bath, stretched, water-washed and subsequently dried.

References Cited

UNITED STATES PATENTS

| | | | |
|---|---|---|---|
| 1,935,203 | 11/1933 | Dreyfus et al. | 264—208 |
| 3,154,609 | 10/1964 | Ciypriani | 264—184 |
| 2,615,866 | 10/1952 | Gilbert et al. | |
| 3,350,489 | 10/1967 | Jamison | 264—203 |

FOREIGN PATENTS

| | | |
|---|---|---|
| 868,710 | 1/1953 | Great Britain. |
| 809,346 | 2/1959 | Great Britain. |

JULIUS FROME, Primary Examiner

HERBERT MINTZ, Assistant Examiner

U.S. Cl. X.R.

260—30.8, 32.4, 32.8; 264—184, 203, 205